(12) United States Patent
Kendall et al.

(10) Patent No.: US 12,304,062 B2
(45) Date of Patent: May 20, 2025

(54) PART TRANSFER SYSTEM

(71) Applicant: The Boeing Company, Chicago, IL (US)

(72) Inventors: James R. Kendall, Mt. Pleasant, SC (US); Paul D. Shaw, Seattle, WA (US); Raviendra S. Suriyaarachchi, Kirkland, WA (US); Santiago M. Mejia, Johns Island, SC (US); Samantha Eberhardt, Charleston, SC (US); Samuel J. Knutson, Charleston, SC (US); Brian S. Carpenter, Summerville, SC (US); Byron J. Autry, Charleston, SC (US)

(73) Assignee: The Boeing Company, Chicago, IL (US)

(*) Notice: Subject to any disclaimer, the term of this patent is extended or adjusted under 35 U.S.C. 154(b) by 888 days.

(21) Appl. No.: 17/470,435

(22) Filed: Sep. 9, 2021

(65) Prior Publication Data

US 2022/0212352 A1 Jul. 7, 2022

Related U.S. Application Data

(60) Provisional application No. 63/133,553, filed on Jan. 4, 2021.

(51) Int. Cl.
*B25J 15/06* (2006.01)
*B25J 13/08* (2006.01)
(Continued)

(52) U.S. Cl.
CPC ......... *B25J 15/0633* (2013.01); *B25J 13/087* (2013.01); *B25J 15/0052* (2013.01); *B64F 5/10* (2017.01)

(58) Field of Classification Search
CPC .............. B25J 15/0625; B25J 15/0633; B25J 15/0683; B25J 13/08; B25J 13/082;
(Continued)

(56) References Cited

U.S. PATENT DOCUMENTS 4,362,461 A * 12/1982 Cathers .................... B65H 5/08
198/468.4
4,527,783 A * 7/1985 Collora ................ B25B 11/005
269/297

(Continued)

*Primary Examiner* — James R Bidwell
(74) *Attorney, Agent, or Firm* — Yee & Associates, P.C.

(57) ABSTRACT

A part transfer system includes a movable support, a plurality of arms coupled to the movable support, and an end effector coupled to each of the plurality of arms. The end effector includes a body and a plurality of dividers each coupled to the body. The plurality of dividers divides the body into a plurality of partitions. The end effector includes a plurality of vacuum ports each in fluid communication with one of the plurality of partitions. The part transfer system further includes a vacuum source in fluid communication with at least one of the plurality of vacuum ports. Each of the plurality of vacuum ports is configured to draw a fluid from the plurality of partitions to establish a vacuum between the end effector and a part that is engaged with the end effector, thereby securing the part to the end effector.

20 Claims, 10 Drawing Sheets

(51) Int. Cl.
*B25J 15/00* (2006.01)
*B64F 5/10* (2017.01)

(58) Field of Classification Search
CPC ..... B66C 1/0237; B66C 1/025; B65G 47/912; B65G 47/918
USPC .......................................................... 294/65
See application file for complete search history.

(56) References Cited

U.S. PATENT DOCUMENTS

| | | | |
|---|---|---|---|
| 4,828,304 A | 5/1989 | No et al. | |
| 7,261,350 B2 * | 8/2007 | Isetani | B25J 15/0616 294/185 |
| 7,708,546 B2 * | 5/2010 | Lee | B29C 53/04 425/356 |
| 9,663,247 B2 * | 5/2017 | Rotter | B66C 1/0281 |
| 9,699,420 B2 | 7/2017 | Park | |
| 10,537,981 B2 * | 1/2020 | Lee | B25J 15/0625 |
| 2005/0263949 A1 * | 12/2005 | Boyl-Davis | B25B 11/007 269/266 |
| 2013/0127192 A1 * | 5/2013 | Regan | B32B 38/1858 294/185 |
| 2013/0127194 A1 | 5/2013 | Regan et al. | |
| 2013/0129464 A1 | 5/2013 | Regan et al. | |
| 2015/0063972 A1 | 3/2015 | Girtman et al. | |
| 2015/0314583 A1 | 11/2015 | Jess et al. | |
| 2020/0039092 A1 | 2/2020 | Reinhold et al. | |

\* cited by examiner

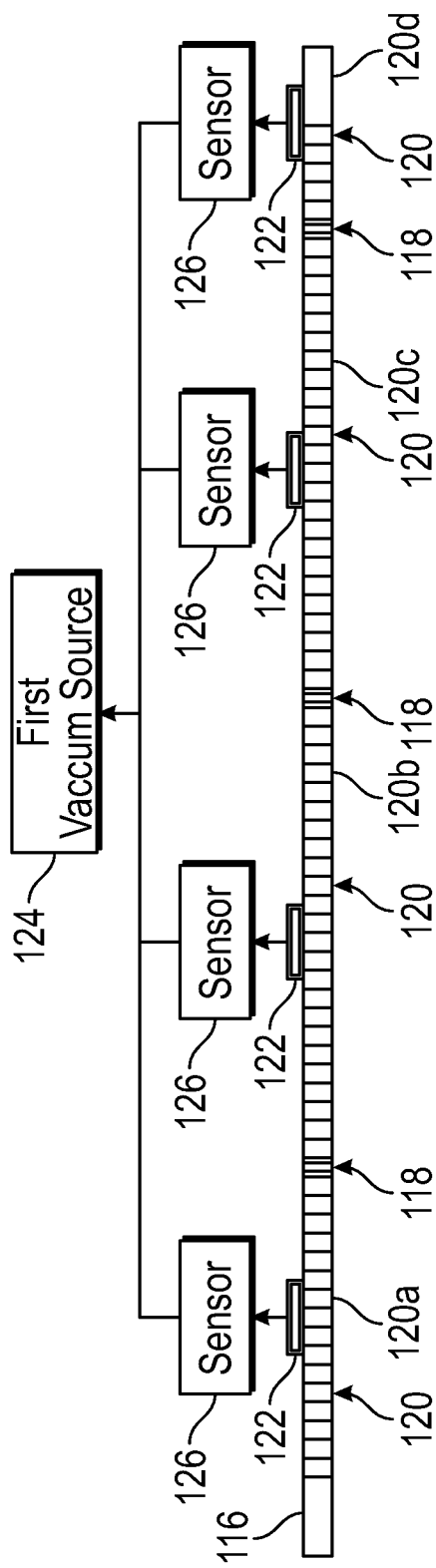
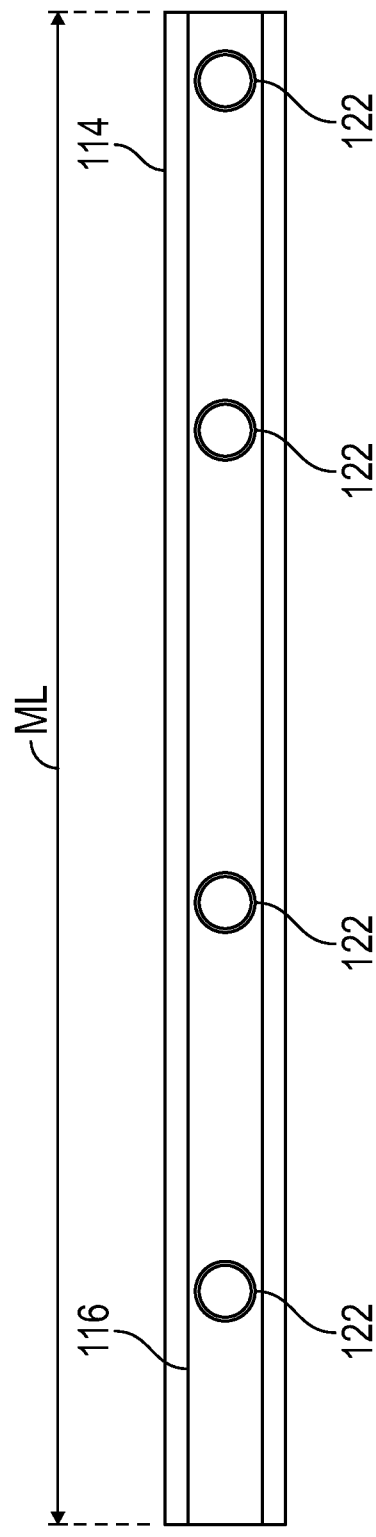

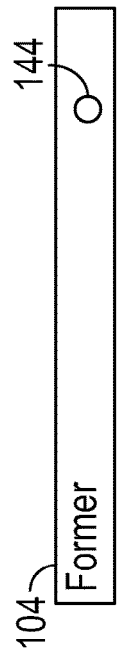
FIG. 8
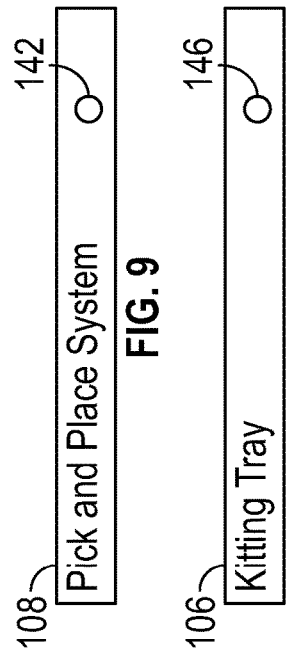
FIG. 9
FIG. 10
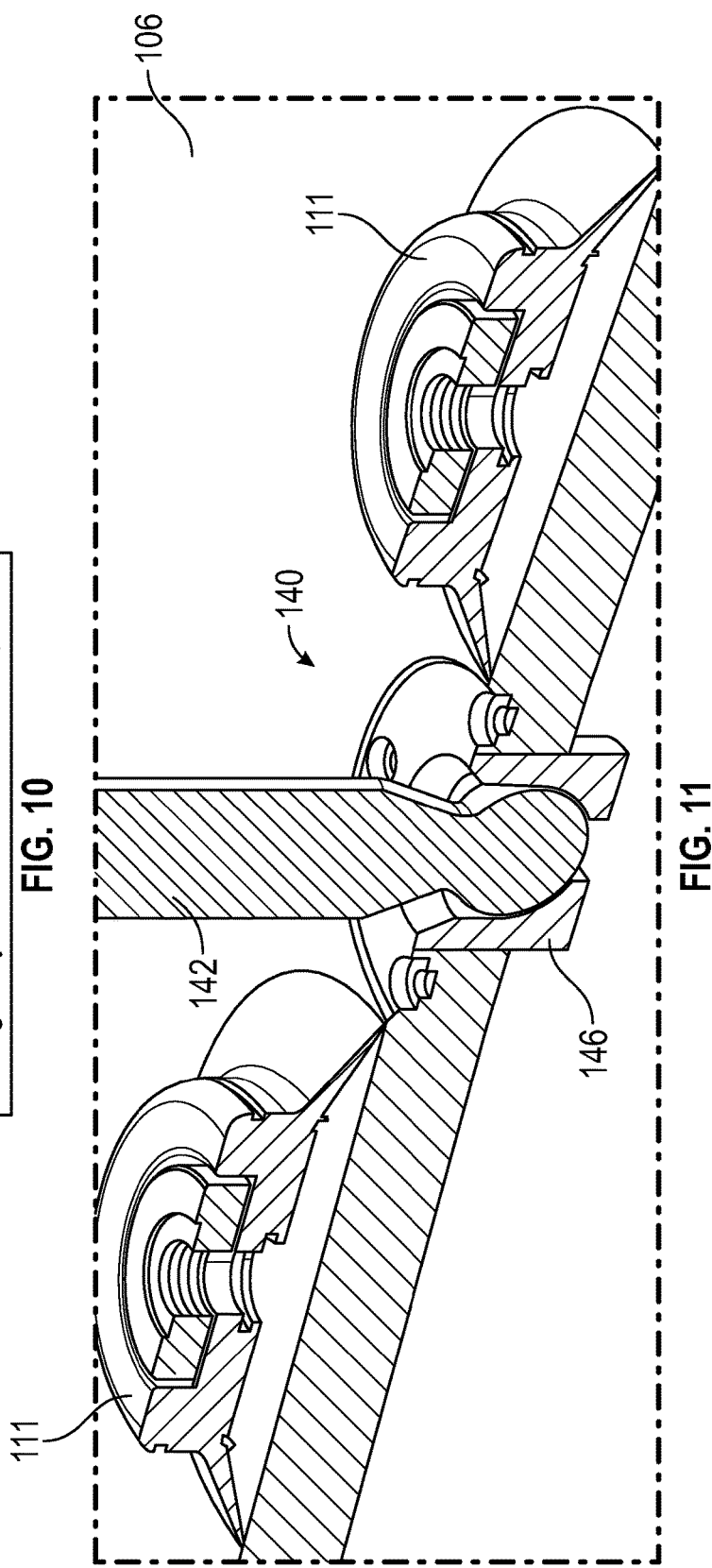
FIG. 11

PART TRANSFER SYSTEM

TECHNICAL FIELD

This application claims priority, and the benefit of, U.S. Provisional Patent Application No. 63/133,533 filed on Jan. 4, 2021, the entire disclosure of which is incorporated by reference herein.

TECHNICAL FIELD

The present disclosure generally relates to a manufacturing system, and more particularly, to a part transfer system.

BACKGROUND

During manufacturing of some mechanical systems, such as aircraft, some components may need to be transferred from one place to another. To do so, a manufacturing system may pick a component at one location and move it to another location. The manufacturing system may include an end effector capable of holding the component. Such end effector may then be moved to transfer the component to another location.

SUMMARY

The present disclosure describes a part transfer system and method for transferring a part, such as a stringer or another polymer composite object, from one location, such as a former, to another location, such as a kitting tray. The presently disclosed part transfer system allows parts, such as stringers, of different sizes to be transferred from one location to another location without significant changes to this system, thereby reducing manufacturing costs and time.

In an aspect of the present disclosure, the part transfer system includes a movable support, a plurality of arms coupled to the movable support, and an end effector coupled to each of the plurality of arms. The end effector includes a body and a plurality of dividers each coupled to the body. The plurality of dividers divides the body into a plurality of partitions. The end effector includes a plurality of vacuum ports each in fluid communication with one of the plurality of partitions. The part transfer system further includes a vacuum source in fluid communication with at least one of the plurality of vacuum ports. Each of the plurality of vacuum ports is configured to draw a fluid from the plurality of partitions to establish a vacuum between the end effector and a part that is engaged with the end effector, thereby securing the part to the end effector.

The part transfer system may further include a plurality of sensors each coupled to one of the plurality of partitions. Each of the plurality of sensors is configured to sense whether a pressure in each of the plurality of partitions is equal to or less than a predetermined pressure threshold, and the end effector is configured to be secured to the part when the pressure in at least one of the plurality of partitions is equal to or less than the predetermined pressure threshold. At least one of the plurality of sensors may be a flow sensor. At least one of the plurality of sensors may be a passive pressure sensor.

The plurality of partitions may include at least a first partition and a second partition. The first partition and the second partition may be detachably coupled to each other. The vacuum source may be configured to selectively draw the fluid from at least one of the plurality of partitions.

The part transfer system may further include a kitting tray configured to receive the part. The movable support may be configured to move to thereby place the part on the kitting tray. The vacuum source may be referred to as a first vacuum source, and the part transfer system may further include a second vacuum source in fluid communication with the kitting tray. The kitting tray may include a tray body and a plurality of vacuum tray ports extending through the tray body. Each of the plurality of vacuum tray ports may be in fluid communication with the second vacuum source to draw a gas from the plurality of vacuum tray ports to thereby secure the part to the kitting tray when the part is disposed on the kitting tray.

The part transfer system may further include an indexing mechanism configured to align the end effector with a former and with the kitting tray. The indexing mechanism may be a cup/cone system.

The part transfer system may further include a controller in communication with the first vacuum source. The controller may be programmed to command the first vacuum source to fluidly disconnect from the plurality of vacuum ports of the end effector when the plurality of vacuum tray ports is in fluid communication with the second vacuum source. The end effector has a maximum length, and at least two of the plurality of vacuum ports may be spaced apart from each other along the maximum length of the end effector.

The present disclosure also describes a method of transferring a part, such as a stringer. In an aspect of the present disclosure, the method includes: (a) activating a vacuum source, wherein the vacuum source is in fluid communication with a plurality of partitions of an end effector, the end effector includes a plurality of vacuum ports each in fluid communication with at least one of the plurality of partitions; (b) moving the end effector toward the part until the end effector engages the part; (c) maintaining the end effector stationary after the end effector engages the part until the pressure in at least one of the plurality of partitions is equal to or less than a predetermined pressure threshold; and (d) moving the end effector along with the part toward a kitting tray until the part is placed on the kitting tray.

The method may further include sensing the pressure in each of the plurality of partitions using a plurality of sensors. Each of the plurality of sensors may be configured to sense whether the pressure in each of the plurality of partitions is equal to or less than the predetermined pressure threshold. The end effector may be configured to be secured to the part when the pressure in at least one of the plurality of partitions is equal to or less than the predetermined pressure threshold. The method may further include detaching at least one of the plurality of partitions from a rest of the plurality of partitions. The method may further include blocking fluid flow between the vacuum source and at least one of the plurality of vacuum ports.

The vacuum source may be referred to as a first vacuum source as discussed above. The method may further include fluidly disconnecting the vacuum source from the plurality of vacuum ports of the end effector after the part is placed on the kitting tray. The kitting tray may include a tray body and a plurality of vacuum tray ports extending through the tray body. Each of the plurality of vacuum tray ports may be in fluid communication with a second vacuum source to draw a gas from the plurality of vacuum tray ports to secure the part to the kitting tray when the part is disposed on the kitting tray.

The method may further include fluidly connecting the second vacuum source to the plurality of vacuum tray ports to draw the gas from the plurality of vacuum tray ports to secure the part to the kitting tray after the part is disposed on the kitting tray. The method may further include commanding, by a controller, the second vacuum source to activate in order to draw the gas from the plurality of vacuum tray ports. The method may further include aligning, using an indexing mechanism, the part with the kitting tray while the moving the end effector along with the part toward the kitting tray.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 3 is a schematic diagram of the pick and place system of FIG. 1.

FIG. 4 is a schematic bottom view of the pick and place system of FIG. 1.

FIG. 8 is a schematic illustration of part of an indexing mechanism for aligning the pick and place system with the former, wherein the former includes a former cup.

FIG. 9 is a schematic illustration of part of an indexing mechanism for aligning the pick and place system, wherein the pick and place system includes a pin.

FIG. 10 is a schematic illustration of part of an indexing mechanism for aligning the pick and place system with the kitting tray, wherein the kitting tray includes a tray cup.

FIG. 11 is a schematic perspective, sectional view of an indexing mechanism, including a pin of the pick and place system placed in the tray cup of the kitting tray.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
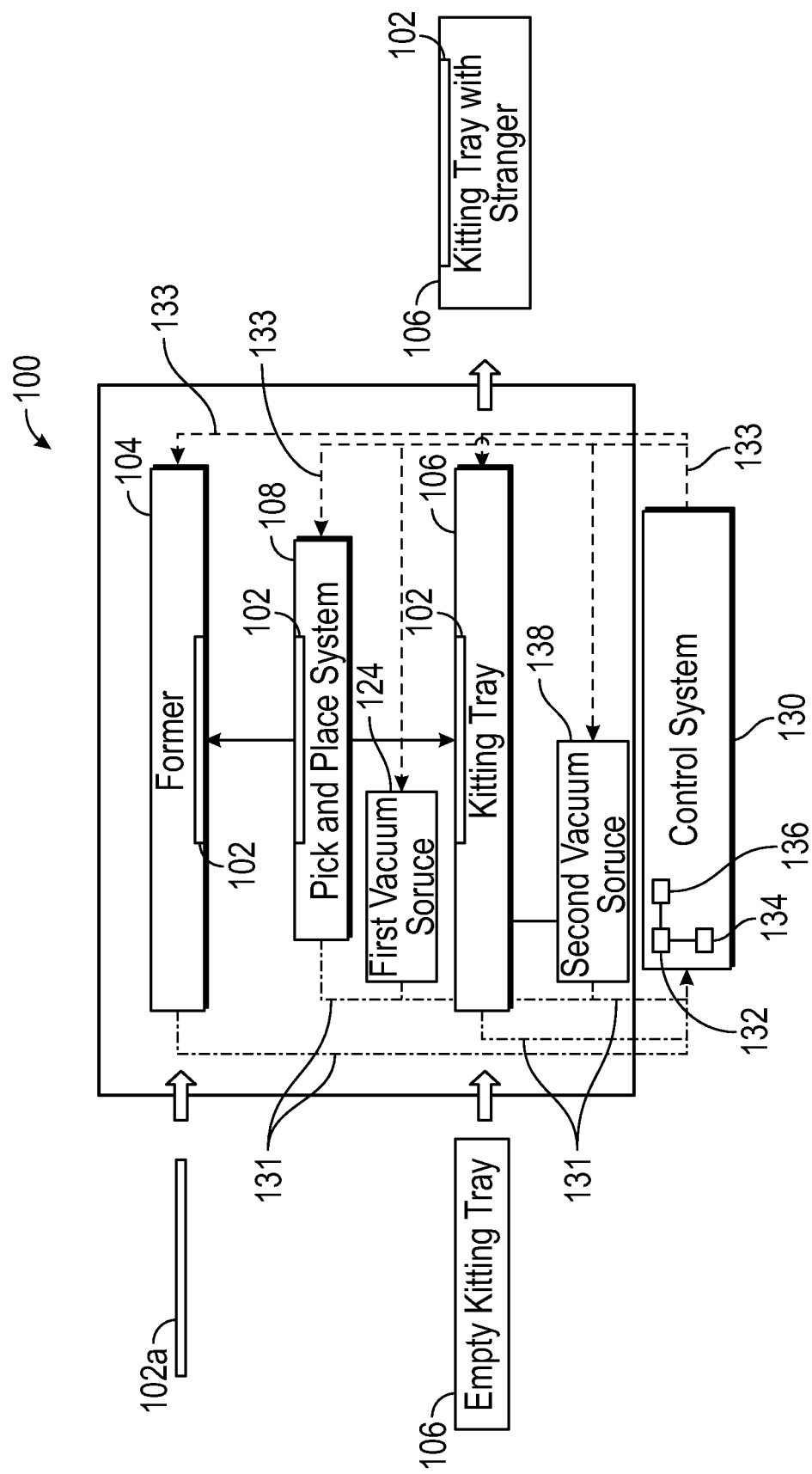
FIG. 1 is a schematic, perspective view of a part transfer system, depicting a pick and place system.
Figure 2:
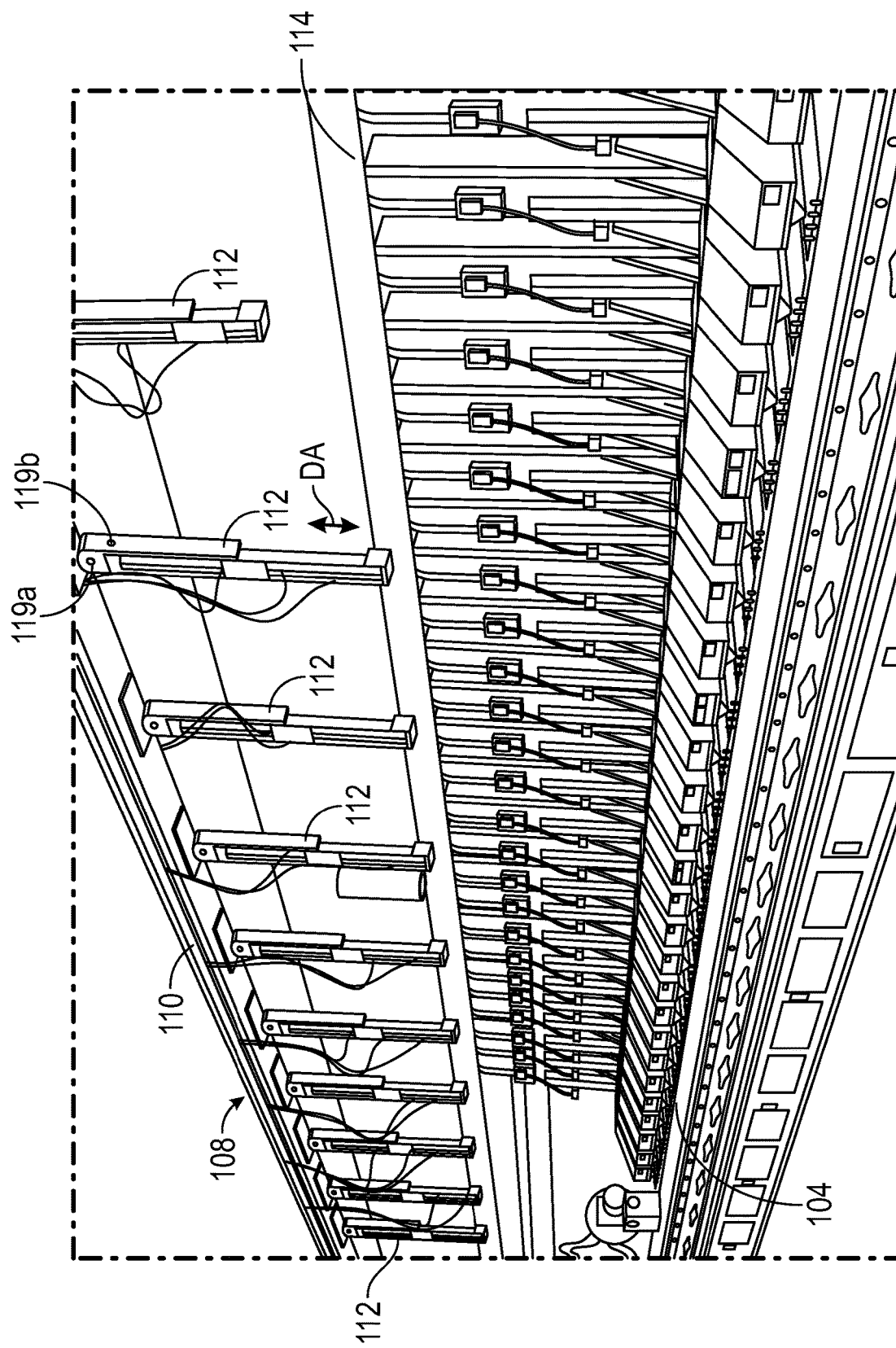
FIG. 2 is a schematic perspective view of the pick and place system of FIG. 1.

With reference to FIGS. 1 and 2, the present disclosure describes a part transfer system 100 for transferring a part 102, such as a stringer, from a former 104 to a kitting tray 106. As used herein, the term "stringer" means a longitudinal structural piece in a framework of an aircraft. When assembled, the part 102 is secured to the skin of an aircraft for structural support. The part 102 may be wholly or partially made of a metallic or polymeric material, such as a polymer composite. Regardless of the material employed, the part 102 may have difference sizes (e.g., lengths).

During the manufacturing process, it may be necessary to move parts 102 of different sizes from the former 104 to the kitting tray 106. It is therefore desirable to use the same part transfer system 100 to transfer parts 102 of different sizes from one location to another. By using the presently disclosed part transfer system 100, the manufacturing operators do not have different transfer systems to move parts 102 of different sizes. Rather, the manufacturing operators may simply use the presently disclosed part transfer system 100 to move parts 102 of different sizes from the former 104 to the kitting tray 106, thereby saving time and reducing costs.

The part transfer system 100 includes a pick and place system 108 configured to pick and then move the part 102 from one location to another location. The pick and place system 108 includes a movable support 110 (FIG. 2) and a plurality of arms 112 (FIG. 2) coupled to the movable support 110. The movable support 110 may be arranged horizontally and may be moved by a crane or another suitable device. As a non-limiting example, the movable support 110 may be configured as a strongback or beam specifically designed to rigidly support the plurality of arms 112. Each of the plurality of arms 112 is coupled to the movable support 110. As a result, the arms 112 can move concomitantly with the movable support 110. Each of the arms 112 can move independently from the movable support 110 and have three axes of freedom. Two axes are pivots 119a, 119b, and one axis is a stroke (i.e., linear motions). Therefore, each arm 112 can move linearly as shown by double arrows DA.

With reference to FIGS. 1-4, the pick and place system 108 further includes an end effector 114 configured to pick and hold the part 102. The end effector 114 may be configured as a compactor to match the inner cavity of the part material 102a (e.g., stringer material) formed on the former 104. Irrespective of its specific configuration, the end effector 114 is attached to the arms 112. Because the arms 112 are coupled to the movable support 110, the end effector 114 can move as the movable support 110 moves.

The end effector 114 includes a body 116 and a plurality of dividers 118 each coupled to the body 116. The dividers 118 divide the body 116 into a plurality of partitions 120. As a consequence, fluid cannot flow between the partitions 120. In other words, the partitions 120 are fluidly decoupled from one another. For this reason, each of the partitions 120 may be referred to as gas-sealed partitions 120. The dividers 118 may be configured, for example, as a metallic or polymeric piece inserted into a kerf of the body 116 of the end effector 114. In the depicted embodiment, the body 116 of the end effector 114 includes four partitions 120, namely: a first partition 120a, a second partition 120b, a third partition 120c, and a fourth partition 120d. It is contemplated, however, that the body 116 of the end effector 114 may be divided into more or fewer partitions 120. One or more of the partitions 120 may be detachably coupled to one another in order to accommodate parts 102 of different sizes. This is primarily contemplated to have a modular system that can be manufactured in short batches (cheaper) and then assembled based on the length of the former. Additionally, this allows for replacement of defective modules should damage occur. So, for example, if we have two parts lines of different lengths, one 60 feet and one 30 feet, then we would use 6 10' modules on the long line and 3 10' modules on the second one. This allows the first line to build any length parts up to 60' and the second to build any length up to 30' while both lines use the same part for their end effector modules. For instance, the first partition 120a and the second partition 120b may be detachably coupled to each other. The second partition 120b and the third partition 120c may be detachably coupled to each other, and the third partition 120c and the fourth partition 120d may be detachably coupled to each other. By detachably coupling partitions 120 to one another, the pick and place system 108 can accommodate parts 102 of different sizes.

Figure 5:
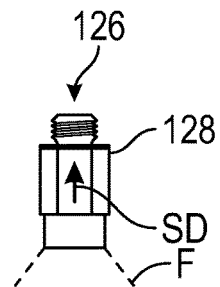
FIG. 5 is a schematic front view of a sensor of the pick and place system of FIG. 1.

The end effector 114 further includes a plurality of vacuum ports 122. Each vacuum port 122 is in fluid communication with at least one of the partitions 120. The vacuum ports 122 may be directly attached to the body 116 of the end effector 114. Each vacuum port 122 may be configured as a hole fluidly coupled to one or more of the partitions 120. The part transfer system 100 further includes a first vacuum source 124 in fluid communication with the plurality of partitions 120 through the vacuum ports 122, thereby allowing fluid to flow from the partitions 120 to the first vacuum source 124 via the vacuum ports 122. Upon activation of the first vacuum source 124, each of vacuum ports 122 is configured to draw a fluid F (FIG. 5), such as air, from the plurality of partitions 120 to establish a vacuum between the end effector 114 and the part 102 that is engaged with the end effector 114 to secure the part 102 to the end effector 114. The end effector 114 has a maximum length ML, and at least two of the vacuum ports 122 are spaced apart from each other along the maximum length ML of the end effector 114 to accommodate parts 102 of different sizes.

With reference to FIGS. 1-5, the pick and place system 108 further includes a plurality of sensors 126 each coupled to one or more of the partitions 120. Each sensor 126 is configured to sense whether a pressure in one of the plurality of partitions 120 is less than a predetermined pressure threshold. When the pressure in one or more of the partitions 120 is equal or less than the predetermined pressure threshold, the end effector 114 is secured to the part 102. In other words, when the pressure in one or more of the partitions 120 is equal to or less than the predetermined pressure threshold, the vacuum created between the end effector 114 and the part 102 causes the end effector 114 to securely hold the part 102. As discussed above, the sensors 126 detect when the pressure in each of the partitions 120 is equal to or less than the predetermined pressure threshold. As a non-limiting example, one or more of the sensors 126 may be configured as a passive pressure sensor or a flow sensor. For instance, one or more of the sensors 126 may be configured as a check valve 128 (FIG. 5) that only allows fluid flow in a single direction SD, but prevents fluid flow in the opposite direction. However, when the pressure in one or more of the partitions 120 is equal to or less than the predetermined pressure threshold, the check valve 128 prevents the fluid F, from flowing in both the single direction SD and its opposite direction, thereby indicating that the pressure in one or more of the partitions is equal to or less than the predetermined pressure threshold. Thus, a first vacuum source 124 is configured to selectively draw the fluid F (FIG. 5) from one or more of the partitions 120 of the end effector 114. A control system 130 (i.e., the controller) is in communication with the first vacuum source 124 and, as such, the control system 130 can control the operation of the first vacuum source 124. For example, the control system 130 may be programmed to command the first vacuum source 124 to fluidly disconnect from the vacuum ports 122 of the end effector 114 when the vacuum tray ports 111 of the kitting tray 106 are in fluid communication with a second vacuum source 138.

The sensors 126 and the vacuum ports 122 of the end effector 114 are in fluid communication with the first vacuum source 124. The first vacuum source 124 may be configured as a vacuum pump or another device that that removes gas molecules from a sealed volume in order to leave behind a full or partial vacuum. In the present disclosure, each partition 120 of the body 116 of the end effector 114 defines a gas-sealed volume. Upon activation of the first vacuum source 124, gas molecules are removed from the partitions 120 (which are gas-sealed) in order to leave a full or partial vacuum in the partitions 120, thereby allowing the end effector 114 to secularly hold the part 102. Once the pressure in the partitions 120 of the end effector 114 is equal to or less than the predetermined pressure threshold, the movable support 110 can be moved in order to move the end effector 114 (which securely holds the part 102) to the kitting tray 106.

The part transfer system 100 may further include a control system 130 in electronic communication with the kitting tray 106, the pick and place system 108, and the first vacuum source 124. Accordingly, the control system 130 is configured to receive input data 131 from and provide output data 133 to the kitting tray 106, the pick and place system 108, and the first vacuum source 124. The control system 130 may also be referred to as the controller and may include hardware elements such as a processor 132, circuitry including but not limited to a timer, oscillator, analog-to-digital (A/D) circuitry, digital-to-analog (D/A) circuitry, a digital signal processor, and input/output (I/O) devices and other signal conditioning and/or buffer circuitry. In addition to the processor 132, the control system 130 may include memory 134 in communication with the processor 132. The memory 134 may include tangible, non-transitory memory such as read only memory (ROM), e.g., magnetic, solid-state/flash, and/or optical memory, as well as sufficient amounts of random-access memory (RAM), electrically-erasable programmable read-only memory (EEPROM), and the like. The control system 130 may additionally include a user-interface 136 in communication with the processor 132. The user-interface 136 may include a keyboard, a display, a touch screen, or other input or output devices that allow a user to input data and the processor to output data. Aside from the user-interface 136, the control system 130 may use other hardware or software to control the part transfer system 100.

The control system 130 may also be in electronic communication with the second vacuum source 138 that is in fluid communication with the kitting tray 106. The second vacuum source 138 may be a vacuum pump or another device that that removes gas molecules from a sealed volume in order to leave behind a full or partial vacuum in the kitting tray 106 as discussed below. Although the depicted embodiment shows the first vacuum source 124 for the pick and place system 108 and the second vacuum source 138 for the kitting tray 106, it is envisioned that the part transfer system 100 may include more or fewer vacuum sources. For example, the part transfer system 100 may include a single vacuum source for both the pick and place system 108 and the kitting tray 106.

Figure 6:
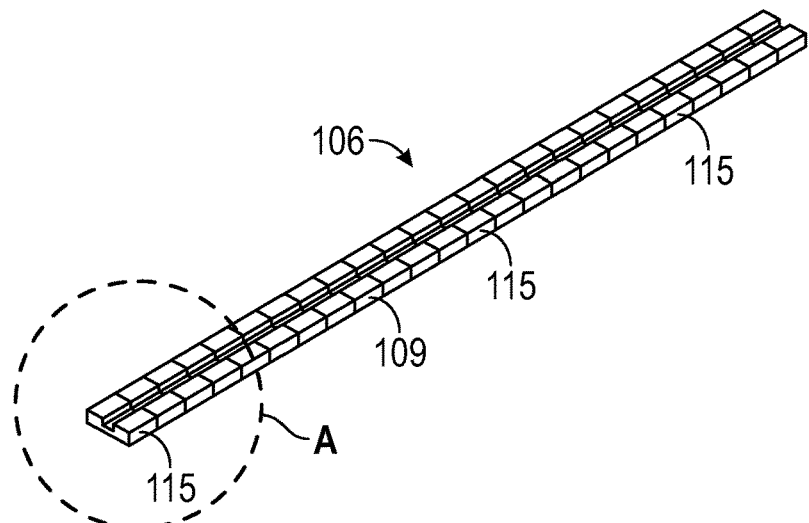
FIG. 6 is a schematic perspective view of a kitting tray of the part transfer system of FIG. 1.
Figure 7:
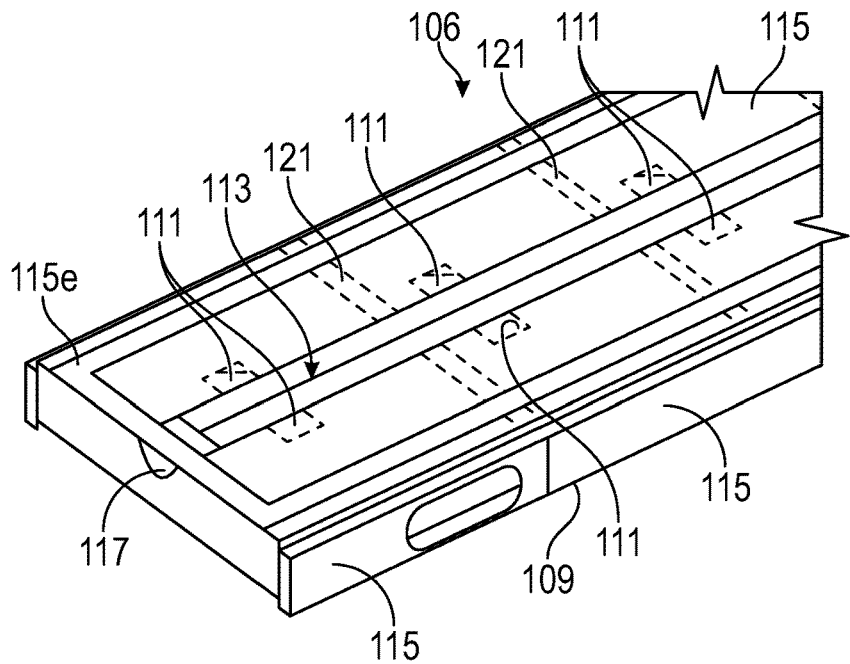
FIG. 7 is a schematic, enlarged perspective view of a portion of the kitting tray, taken around area A of FIG. 6.
Figure 12:
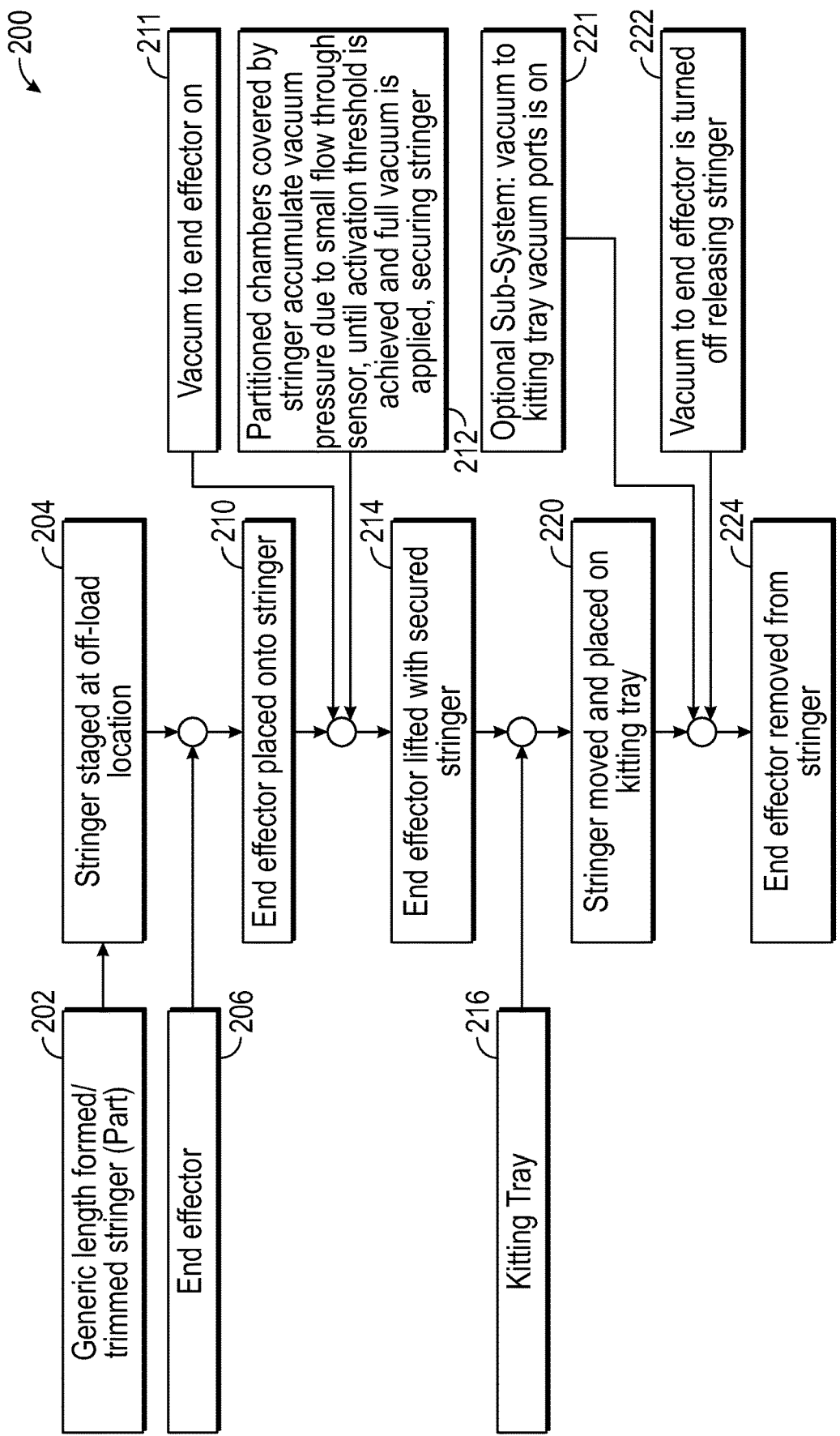
FIG. 12 is a flowchart of a method of transferring a part.

With reference to FIGS. 1, 6, and 7, as discussed above, the pick and place system 108 is configured to move the part 102 from the former 104 to the kitting tray 106. The kitting tray 106 is configured to receive the part 102. The kitting tray 106 includes a tray body 109 and a recess 113 defined in the tray body 109 configured, shaped, and sized to receive the part 102. The kitting tray 106 can be either straight for generic stringers or include a net shape of a unique or semi-unique stringer. The recess 113 may extend along the entire length of the tray body 109. Regardless of its specific shape, the kitting tray 106 has a plurality of vacuum tray ports 111 extending through the tray body 109. It is contemplated that the kitting tray 106 may include a raised portion/plateau instead of the recess 113. This raised portion may act as a male tooling surface to mate with a female part 102. In this case, the end effector 114 may be a female tool to pick up the part 102 that was formed on a male tool. The part 102 may then be moved to a male tool tray. Each of the vacuum tray ports 111 is in fluid communication with the second vacuum source 138. In other words, the kitting tray 106 is in fluid communication with the second vacuum source 138 through the vacuum tray ports 111. The vacuum tray ports 111 may be arranged along the length of the tray body 109 on opposite sides of the recess 113 to securely hold the part 102 when the part 102 is placed in the recess 113 and the second vacuum source 138 is activated. The kitting tray 106 may include vacuum tray ports 111 in a stringer flange area to secure the flange from natural relaxation that tends to lift up. The flatness helps the scanners verify the shape and size of the fabricated stringer. For other configurations of trays that have male features, the vacuum features may be positioned as needed on the cross-section to assist manufacturing. The second vacuum source 138 is configured to draw a gas (e.g., air) from the vacuum tray ports 111 to secure the part 102 to the kitting tray 106 when the part 102 is disposed on the kitting tray 106.

The kitting tray 106 includes a plurality of segments 115 that can be decoupled from each other. The kitting tray 106 includes a plurality of dividing walls 121 to divide the segments 115, thereby preventing fluid from between the segments 115. Due to the segments 115 and the dividing walls 121, the kitting tray 106 can accommodate the part 102 independently of its size when the second vacuum source 138 is activated. The vacuum chambers created by the segment 115 can be sized appropriately to generate any needed resolution for accommodating varying incremental differences in part length. The segments 115 are also detachably coupled to one another. Thus, one or more segments 115 of the kitting tray 106 may be detached from the other segments 115 to accommodate parts 102 of different sizes. For example, the kitting tray 106 may be ten feet long with a number of five-foot segments 115. Alternatively, we may have 10' trays using 5' modules to accommodate short stringers, then 20' and 30' and so forth and just roundup the stringer length. Also, the kitting tray 106 may be 20 feet long or 30 feet long. Alternatively, the kitting tray 106 may be a 40-foot tray for all parts 102 regardless of part length. The kitting tray 106 may include an end plug 117 to gas-seal an end segment 115*e* of the segments 115. The fluid separations happen at the vacuum tray ports 111 points, but not necessarily throughout. The kitting tray 106 may have fluid continuity between the segments 115 to distribute vacuum for the vacuum tray ports 111. The kitting tray 106 itself may not be a vacuum chamber due to weight but rather a hose is used to move the small amount of air. The kitting tray 106 does not act like an accumulator and, therefore, does not reduce the responsiveness of the sensors.

With reference to FIGS. 8-11, the part transfer system 100 further includes an indexing mechanism 140 configured to align the pick and place system 108 with the former 104 and/or the kitting tray 106. The indexing mechanism 140 may be a cup-cone system, and in such case, the pick and place system 108 may include a pin 142. Alternatively, the indexing mechanism 140 may be an optical, hard stop points, global positioning system (GPS), or another type of indexing mechanism. The former 104 may include a former cup 144 (or cone) shaped and sized to receive the pin 142 of the pick and place system 108 to align the pick and place system 108 with the former 104. The kitting tray 106 may include a tray cup 146 (or cone) configured to receive the pin 142 to align the pick and place system 108 with the kitting tray 106. To align the kitting tray 106 with the pick and place system 108, the pin 142 is placed inside the tray cup 146 of the kitting tray 106. The pin 142 is therefore shaped and sized to be disposed inside the tray cup 146 to align the kitting tray 106 with the pick and place system 108 and is shaped and sized to be disposed inside the former cup 144 to align the pick and place system 108 with the former 104.

With reference to FIGS. 12-16, a method 200 can be executed to transfer the part 102 from one location to another location, such as from the former 104 to the kitting tray 106. The method 200 begins at block 202, where the part 102 or stringer material 102*a* is provided. The part 102 may be a generic length or may be trimmed to a desired length. The method 200 then proceeds to block 204.

Figure 13:
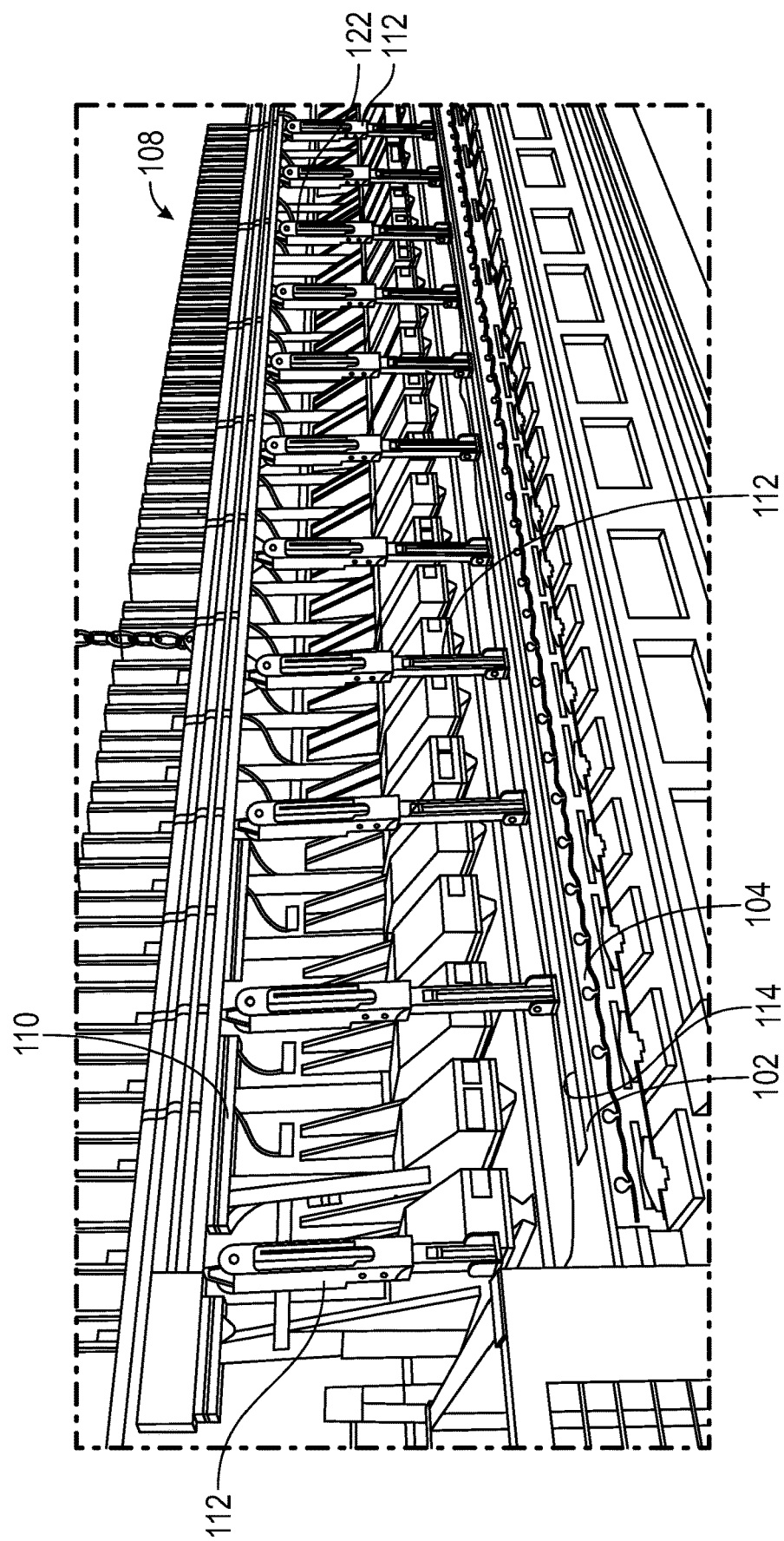
FIG. 13 is a schematic perspective view of the part transfer system of FIG. 1, wherein the end effector is engaged with the part.

At block 204, the part 102 is placed at a predetermined location, such as on the former 104 as shown in FIG. 13. In other words, the part 102 is staged at an off-location, such as the former 104. At block 204, one or more of the partitions 120 may be detached from the rest of the partitions 120 to accommodate the length of the part 102. Alternatively, the part 102 is supported with the fully covered partitions 120. The partially covered partitions 102 on the end do not engage due to the sensors 126, the stiffness of the part 102 is enough to keep the part 102 straight. The method 200 then proceeds to block 206. At block 206, the end effector 114 is provided. As discussed above, the end effector 114 may function as a compactor to shape the shape of the part 102. After block 206, the method 200 continues to block 210.

At block 210, the end effector 114 is moved toward the part 102 until the end effector 114 engages the part 102. For example, the end effector 114 may be moved toward the part 102 until the end effector 114 is in direct contact with the part 102. While moving the end effector 114 toward the part 102, the end effector 114 may be aligned with the former 104 by inserting the pin 142 into the former cup 144 of the indexing mechanism 140 (or by using another suitable indexing mechanism). The end effector 114 may apply pressure to the part 102 disposed on the former 104 to change the shape of the part 102, thereby allowing the part 102 to be assembled onto a specific airplane. Alternatively, the former 104 may create the part 102 (e.g., stringer) and the end effector 114 may only retrieve the part 102. When the end effector 114 engages the part 102, the partitions 120 of the end effector 114 are covered by the part 102. In the method 200, the first vacuum source 124 is also provided at block 211. At this stage of the process, the first vacuum source 124 is ON after placing the end effector 114 engages the part 102 at block 210. Hence, at block 211, the first vacuum source 124 is activated. As discussed above, the first vacuum source 124 is in fluid communication with the partitions 120 of the end effector 114 through vacuum ports 122. Then, the method 200 continues to block 212.

At block 212, the partitions 120 of the end effector 114 that are covered by the part 102 accumulate vacuum pressure due to the small flow through the sensors 126. This vacuum pressure is accumulated until the vacuum pressure at each of the partitions 120 is equal to or less than the predetermined pressure threshold. To do so, the first vacuum source 124 should be ON until the vacuum pressure at each of the partitions 120 is equal to or less than the predetermined pressure threshold, and the end effector 114 should be maintained stationary until the vacuum pressure at each of the partitions 120 is equal to or less than the predetermined pressure threshold. At block 212, the sensors 126 sense whether the pressure in each of the partitions 120 is equal to or less than the predetermined pressure threshold. When the pressure in each of the partitions 120 is equal to or less than the predetermined pressure threshold, the part 102 is secured to the end effector 114. The sensors 126 may be check valves that allow the fluid F to flow from the part 102 into the first vacuum source 124 while vacuum pressure in the partitions 120 is greater than the predetermined pressure threshold, but block the fluid F from flowing between the part 102 and the end effector when the vacuum pressure in the partitions is equal to or less than the predetermined pressure sensor. In other words, at block 212, the fluid flow between the first vacuum source 124 and the vacuum ports 122 may be blocked once the vacuum pressure in the partitions 120 is equal to or less than the predetermined pressure threshold. In response to determining that the pressure in each of the partitions 120 is equal to or less than the predetermined pressure threshold by, for example, the sensors 126, the method 200 proceeds to block 214.

Figure 14:
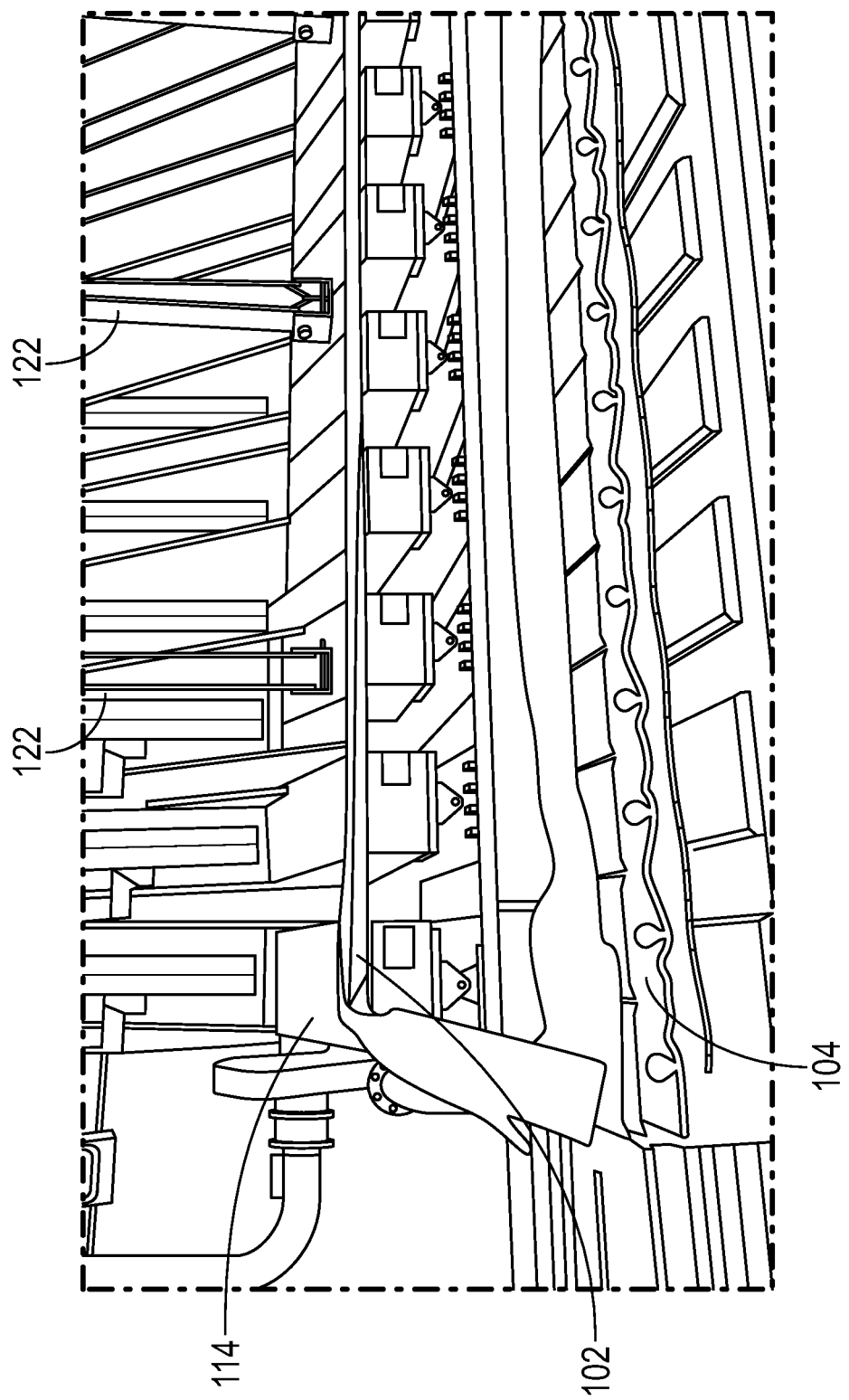
FIG. 14 is a schematic perspective view of the part transfer system of FIG. 1, wherein the part is lifted from the former.

At block 214, the control system 130 may command the pick and place system 108 to automatically lift the end effector 114 with the secured part 102 in response to determining that the pressure in each of the partitions 120 is equal to or less than the predetermined pressure threshold as shown in FIG. 14. At this stage, the part 102 is secured to the end effector 114. Thus, lifting the end effector 114 causes the part 102 to be lifted as well. Alternatively, the control system 130 may generate an alert (such as a visual alert or an audible alert) to notify the user of the part transfer system 100 that the end effector 114 is secured to the part 102 and can therefore be moved to another location, such as the kitting tray 106. The user may then command the pick and place system 108, through the user-interface 136 of the control system 130, to move to another location. The method 200 then proceeds to blocks 216.

Figure 15:
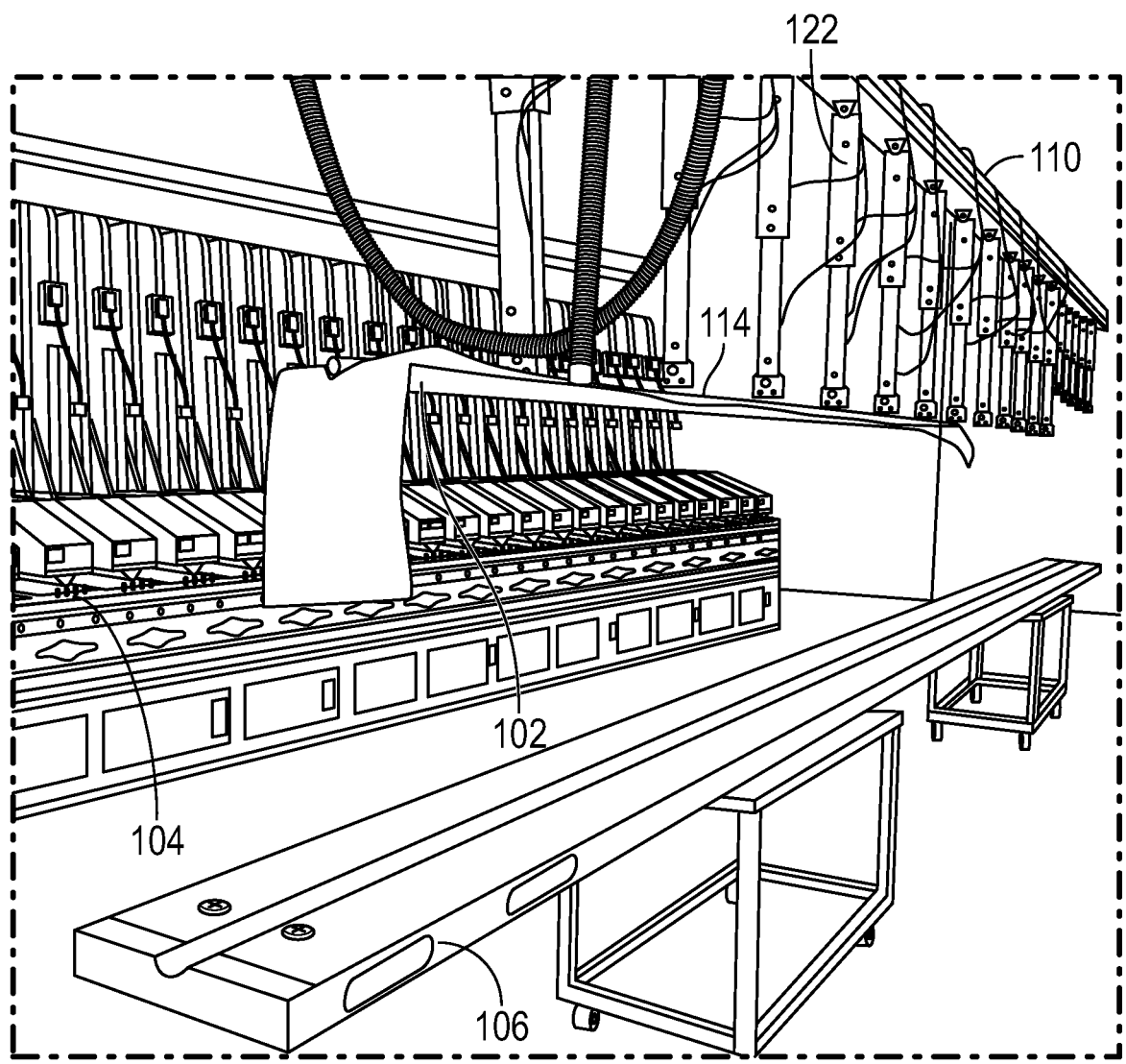
FIG. 15 is a schematic perspective view of the part transfer system of FIG. 1, wherein the part is moving toward the kitting tray.
Figure 16:
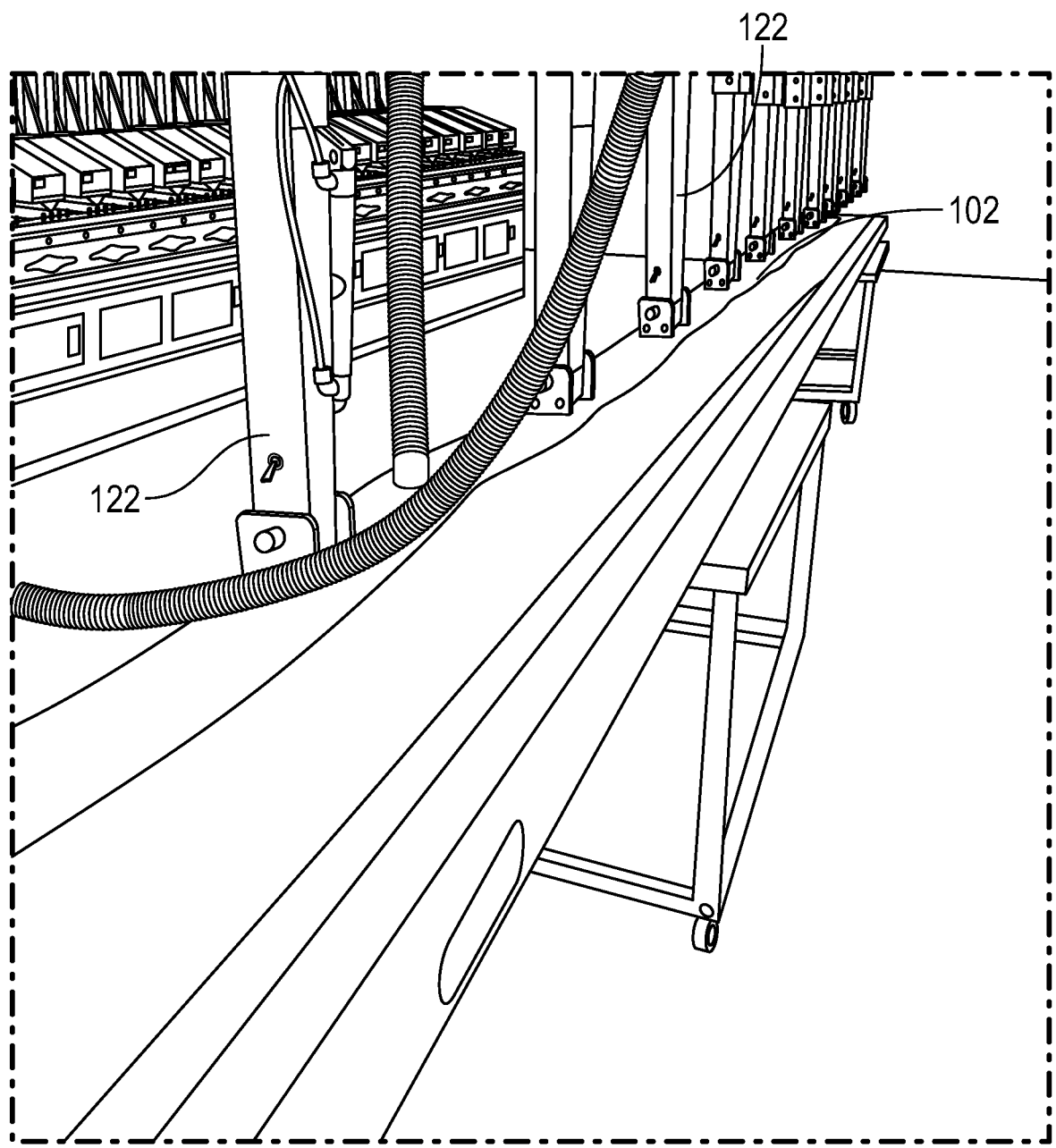
FIG. 16 is a schematic perspective view of the part transfer system of FIG. 1, wherein the part is about to be placed on the kitting tray.

At block 216, the kitting tray 106 is provided. The method 200 then proceeds to block 220. At block 220, the part 102 (which is secured to the end effector 114) is moved toward the kitting tray 106 until the part 102 is placed on the kitting tray 106 as shown in FIGS. 15 and 16. To align the end effector 114 with the kitting tray 106, the pin 142 of the pick and place system 108 may be inserted into the tray cup 146 of the indexing mechanism 140 while moving the part 102. Alternatively, other suitable indexing mechanisms may be used to align the end effector 114 with the kitting tray 106. The method 200 then proceeds to block 221.

At block 221, the second vacuum source 138 may be turned ON to draw a gas (e.g., air) from the vacuum tray ports 111 of the kitting tray 106, thereby securing the part 102 to the kitting tray 106, after the part 102 is placed on the kitting tray 106 at block 220. At block 221, the control system 130 may command the second vacuum source to activate (i.e., turn ON) in response to, for example, determining that the fluid F is no longer drawn thought vacuum ports 122 of the end effector 114. Therefore, at this stage, the second vacuum source 138 is fluidly connected to the vacuum tray ports 111 of the kitting tray 106. Once the part 102 is disposed on the kitting tray 106, the end effector 114 should be maintained connected to (e.g., in direct contact with) the part 102 at the interface of the vacuum pressure between the kitting tray 106 and the part 102 is equal to or less than the predetermined pressure threshold in order to secure the part 102 to the kitting tray 106 before disconnecting the end effector 114 from the part 102. The kitting tray 106 may include sensors, such as the sensors 126, described above to measure the vacuum pressure at the interface between the kitting tray 106 and the part 102. In response to determining that the vacuum pressure at the interface of the kitting tray 106 and the part 102 is equal to or less than the predetermined pressure threshold, the method 200 proceeds to block 222.

At block 222, the first vacuum source 124 may be turned OFF. As a consequence, the part 102 is released from the end effector 114. At block 222, the first vacuum source 124 may be fluidly disconnected from the vacuum ports 122 of the end effector 114. Once the part 102 is released from the end effector 114, the method 200 continues to block 224. At block 224, the end effector 114 is removed from the part 102.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A part transfer system, comprising:
a movable support;
a plurality of arms coupled to the movable support;
an end effector coupled to each of the plurality of arms,
the end effector includes a body and a plurality of dividers each coupled to the body, the plurality of dividers divides the body into a plurality of partitions, and the end effector includes a plurality of vacuum ports each in fluid communication with one of the plurality of partitions;

a vacuum source in fluid communication with at least one of the plurality of vacuum ports, wherein each of the plurality of vacuum ports is configured to draw a fluid from the plurality of partitions to establish a vacuum between the end effector and a part that is engaged with the end effector, thereby securing the part to the end effector;

a kitting tray configured to receive the part; and an indexing mechanism configured to align the end effector with a former and with the kitting tray.

2. The part transfer system of claim 1, further comprising a plurality of sensors each coupled to one of the plurality of partitions, wherein each of the plurality of sensors is configured to sense whether a pressure in each of the plurality of partitions is equal to or less than a predetermined pressure threshold, and the end effector is configured to be secured to the part when the pressure in at least one of the plurality of partitions is equal to or less than the predetermined pressure threshold.

3. The part transfer system of claim 2, wherein at least one of the plurality of sensors is a flow sensor.

4. The part transfer system of claim 2, wherein at least one of the plurality of sensors is a passive pressure sensor.

5. The part transfer system of claim 1, wherein the plurality of partitions includes at least a first partition and a second partition, and the first partition and the second partition are detachably coupled to each other.

6. The part transfer system of claim 1, wherein the vacuum source is configured to selectively draw the fluid from at least one of the plurality of partitions.

7. The part transfer system of claim 1, wherein the movable support is configured to move to place the part on the kitting tray.

8. The part transfer system of claim 7, wherein the vacuum source is a first vacuum source, and the part transfer system further comprises a second vacuum source in fluid communication with the kitting tray, the kitting tray includes a tray body and a plurality of vacuum tray ports extending through the tray body, and each of the plurality of vacuum tray ports is in fluid communication with the second vacuum source to draw a gas from the plurality of vacuum tray ports to secure the part to the kitting tray when the part is disposed on the kitting tray.

9. The part transfer system of claim 1, wherein the partitions are fluidly decoupled from one another to define gas-sealed partitions.

10. The part transfer system of claim 8, wherein the indexing mechanism is a cup/cone system.

11. The part transfer system of claim 8, further comprising a controller in communication with the first vacuum source, wherein the controller is programmed to command the first vacuum source to fluidly disconnect from the plurality of vacuum ports of the end effector when the plurality of vacuum tray ports are in fluid communication with the second vacuum source.

12. The part transfer system of claim 1, wherein the end effector has a maximum length, and at least two of the plurality of vacuum ports are spaced apart from each other along the maximum length of the end effector.

13. A method of transferring a part, comprising:

activating a vacuum source, wherein the vacuum source is in fluid communication with a plurality of partitions of an end effector, the end effector includes a plurality of vacuum ports each in fluid communication with at least one of the plurality of partitions;

moving the end effector toward the part until the end effector engages the part;

maintaining the end effector stationary after the end effector engages the part until a pressure in at least one of the plurality of partitions is equal to or less than a predetermined pressure threshold;

moving the end effector along with the part toward a kitting tray until the part is placed on the kitting tray; and aligning, using an indexing mechanism, the part with the kitting tray while moving the end effector along with the part toward the kitting tray.

14. The method of claim 13, further comprising sensing the pressure in each of the plurality of partitions using a plurality of sensors, wherein each of the plurality of sensors is configured to sense whether the pressure in each of the plurality of partitions is equal to or less than the predetermined pressure threshold, and the end effector is configured to be secured to the part when the pressure in at least one of the plurality of partitions is equal to or less than the predetermined pressure threshold.

15. The method of claim 13, further comprising detaching at least one of the plurality of partitions from a rest of the plurality of partitions.

16. The method of claim 13, further comprising blocking fluid flow between the vacuum source and at least one of the plurality of vacuum ports.

17. The method of claim 13, wherein the vacuum source is a first vacuum source, and the method further comprises fluidly disconnecting the first vacuum source from the plurality of vacuum ports of the end effector after the part is placed on the kitting tray, wherein the kitting tray includes a tray body and a plurality of vacuum tray ports extending through the tray body, and each of the plurality of vacuum tray ports is in fluid communication with a second vacuum source to draw a gas from the plurality of vacuum tray ports to secure the part to the kitting tray when the part is disposed on the kitting tray.

18. The method of claim 17, further comprising fluidly connecting the second vacuum source to the plurality of vacuum tray ports to draw the gas from the plurality of vacuum tray ports to secure the part to the kitting tray after the part is disposed on the kitting tray.

19. The method of claim 18, further comprising commanding, by a controller, the second vacuum source to activate in order to draw the gas from the plurality of vacuum tray ports.

20. A part transfer system, comprising:

a movable support;

a plurality of arms coupled to the movable support;

an end effector coupled to each of the plurality of arms, the end effector includes a body and a plurality of dividers each coupled to the body, the plurality of dividers divides the body into a plurality of partitions, and the end effector includes a plurality of vacuum ports each in fluid communication with one of the plurality of partitions;

a first vacuum source in fluid communication with at least one of the plurality of vacuum ports, wherein each of the plurality of vacuum ports is configured to draw a fluid from the plurality of partitions to establish a vacuum between the end effector and a part that is engaged with the end effector, thereby securing the part to the end effector;

a kitting tray includes a tray body and a plurality of vacuum tray ports extending through the tray body; and a second vacuum source in fluid communication with the plurality of vacuum tray ports to draw a gas from the plurality of vacuum tray ports to secure the part to the kitting tray when the part is disposed on the kitting tray.

* * * * *